(12) United States Patent
Barrera

(10) Patent No.: US 12,275,316 B2
(45) Date of Patent: Apr. 15, 2025

(54) DYNAMIC VEHICLE CHARGING SYSTEM FOR ELECTRIC VEHICLES

(71) Applicant: Juan Silva Barrera, El Cajon, CA (US)

(72) Inventor: Juan Silva Barrera, El Cajon, CA (US)

( * ) Notice: Subject to any disclaimer, the term of this patent is extended or adjusted under 35 U.S.C. 154(b) by 450 days.

(21) Appl. No.: 17/723,262

(22) Filed: Apr. 18, 2022

(65) Prior Publication Data

US 2023/0226935 A1      Jul. 20, 2023

Related U.S. Application Data

(60) Provisional application No. 63/266,969, filed on Jan. 20, 2022.

(51) Int. Cl.
*B60L 53/22*       (2019.01)
*B60L 58/12*       (2019.01)
*B60W 20/13*       (2016.01)

(52) U.S. Cl.
CPC .............. *B60L 53/22* (2019.02); *B60L 58/12* (2019.02); *B60W 20/13* (2016.01); *B60W 2510/08* (2013.01)

(58) Field of Classification Search
CPC .......... B60L 53/22; B60L 58/12; B60L 53/14; B60L 8/006; B60W 20/13; B60W 2510/08; B60K 1/00; B60K 2016/006; B60Y 2400/20; Y02T 10/70; Y02T 10/7072
USPC ........................................................ 320/104
See application file for complete search history.

(56) References Cited

U.S. PATENT DOCUMENTS

| | | | |
|---|---|---|---|
| 11,286,907 B1* | 3/2022 | Rebek | H02K 7/183 |
| 2004/0084908 A1* | 5/2004 | Vu | F03D 9/32 |
| | | | 290/55 |
| 2022/0111748 A1* | 4/2022 | Fresco | H02J 7/0042 |

* cited by examiner

*Primary Examiner* — Paul Dinh
(74) *Attorney, Agent, or Firm* — Gary L. Eastman, Esq.; Eastman IP

(57) ABSTRACT

The dynamic vehicle charging system for electric vehicles includes one or more wind turbines mounted to a vehicle and positioned for exposure to the wind generated during the vehicle's natural driving motion. The wind turbine drives a generator such that when the vehicle moves through the wind, the wind strikes the wind turbine which generates electricity. This electricity is in turn passed through a power converter that converts the electrical energy from the generator to electrical energy that is used to recharge the vehicle batteries, used to offset the electricity consumption rate of the electric vehicle, or both.

18 Claims, 3 Drawing Sheets

DYNAMIC VEHICLE CHARGING SYSTEM FOR ELECTRIC VEHICLES

RELATED APPLICATION

This application claims the benefit of priority to U.S. Provisional Patent Application titled "Dynamic Vehicle Charging System For Electric Vehicles" which was filed Jan. 20, 2022, assigned Ser. No. 63/266,969

FIELD OF THE INVENTION

The present invention relates generally to battery charging systems. The present invention is more particularly directed to a wind-powered generator used to recharge batteries, and perhaps most useful as a vehicle-mounted wind power generator used to charge a vehicle's batteries during use of the vehicle.

BACKGROUND OF THE INVENTION

As gasoline and fossil fuels generally become more expensive, there has been a monumental shift recently towards the design and manufacturing of electric vehicles. Electric vehicles are thought to be more environmentally friendly modes of transportation as they derive much of their power from being connected to the power grid which is increasingly fed by renewable solar and hydroelectric power sources. These power sources provide a more environmentally acceptable solution to the burning of fossil fuels or coal for the generation of electricity and provide an acceptable solution for short and mid distance transportation.

A problem exists, however, with most current electric vehicles. Specifically, while they are environmentally friendly, they often have limited range due to the limited capacity of their batteries. Typically, an electric vehicle is charged—either at the owner's home using power from the home's power connection to solar or the power grid, or through a dedicated vehicle charging station. However, once charged, the vehicle is disconnected from the charging port or station and begins to travel. From that point on, a traditional electric vehicle drains its electrically stored energy from a full battery to a battery needing recharging. Unfortunately, this need for recharging can occur in the most inopportune times, such as midway to a destination, or where a recharging station is not available. This results in the driver of an electric vehicle being constantly vigilant of the battery power remaining in the vehicle, as well as causing trepidation when faced with longer trips as mid-trip recharging stations may be unavailable, or even if available, often suffer from overcrowding and long delays.

SUMMARY OF THE INVENTION

In light of the above, it would be advantageous to provide a dynamic vehicle charging system for electric vehicles that utilizes the vehicle's motion to generate electrical energy that in turn recharges the batteries or is used to offset the vehicle's consumption rate of electricity. The dynamic vehicle charging system for electric vehicles of the present invention includes one or more wind turbines mounted to or within the vehicle and positioned for exposure to the wind generated during the vehicle's natural driving motion. Each of these wind turbines are in mechanical communication with a generator such that when the wind turbine rotates as a result of the wind passing over or through the turbine, a turbine shaft rotates and is coupled to a generator that generates electricity. This electricity is in turn passed through a power converter that converts the electrical energy from the generator to electrical energy that is used to recharge the vehicle batteries, used to offset the electricity consumption rate of the electric vehicle, or both.

Mounting of the wind turbines is accomplished using the front storage compartment of a typical electric vehicle. Specifically, the front compartments commonly referred to as a "hood" in a vehicle having an internal combustion engine are configured as open storage compartments in electric vehicles. In a preferred embodiment of the dynamic vehicle charging system for electric vehicles of the present invention, the storage compartment is modified to allow air flow from the front grill of a vehicle, past the wind turbines, and out vents to allow the unfettered flow of air from the front of the vehicle, past the turbines and out the vents. This air current, as it flows through the turbines, results in the turbines being rotated which in turn rotates the generator, and the air current then flows out the vents. As the vehicle moves faster through the environment, the speed of the wind through the turbines increases causing a faster rotation of the wind turbine, which in turn generates more electricity. Using the dynamic vehicle charging system for electric vehicles of the present invention, as the battery is discharged to move the vehicle through the environment, the wind causes the wind turbines to rotate generating electricity, which is then used to offset the electricity used to power the vehicle. Using the dynamic vehicle charging system for electric vehicles of the present invention, the usable range of an electric vehicle can be significantly extended.

DETAILED DESCRIPTION OF THE INVENTION

Figure 1:
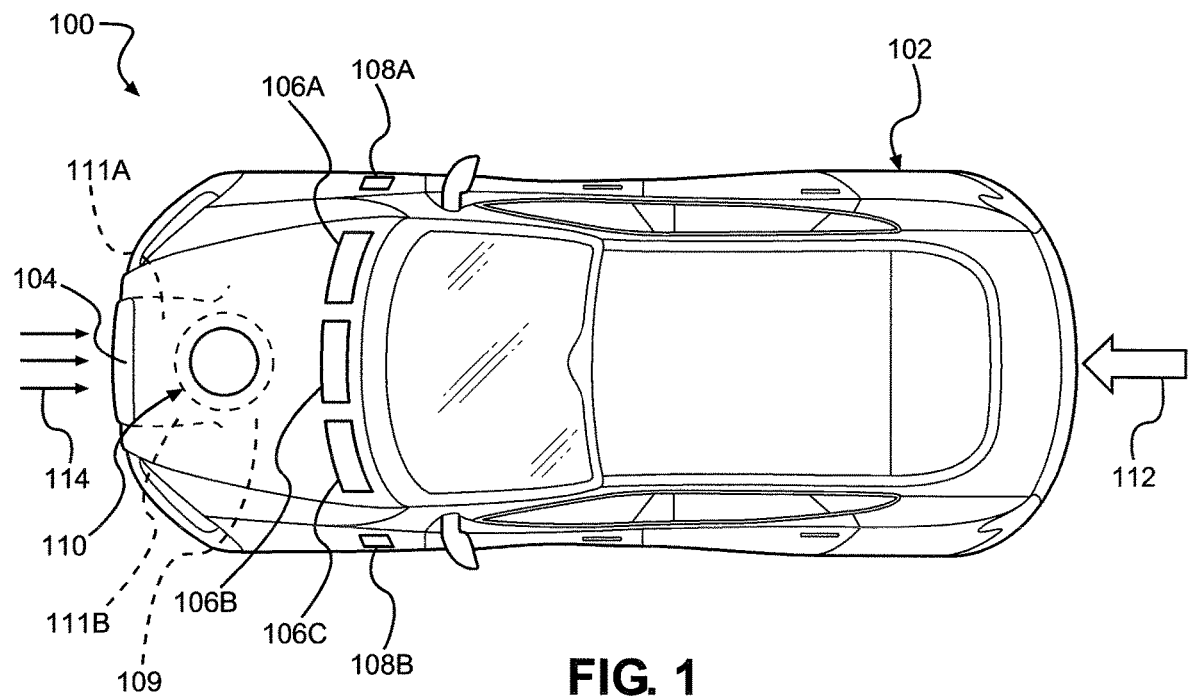
FIG. 1 is a top view of a vehicle equipped with the dynamic vehicle charging system for electric vehicles of the present invention showing the placement of a circular wind turbine within the vehicle's front storage compartment which allow air to pass through the vehicle front grill, over or through the wind turbine, and out through vents as the vehicle moves forward.

Referring initially to FIG. 1, a top view of a vehicle equipped with the dynamic vehicle charging system for electric vehicles of the present invention is shown and generally designated 100. Dynamic vehicle charging system for electric vehicles 100 is mounted to an electric vehicle 102 that has a front grill 104 and a series of hood air vents 106A, 106B, 106C, and side vents 108A and 108B. Wind 114 passes through front grill 104, through compartment 109, and out through vents 106 and 108.

Wind turbine 110 is shown mounted within the vehicle's front storage compartment 109 such that when air to passes through the vehicle front grill 104, over or through the wind turbine 110, and out through hood vents 106 and side vents 108 as the vehicle moves forward, the wind turbine 110 rotates commensurate with the flow of air over or through the wind turbine 110. As the velocity 112 of vehicle 102 increases, the speed of wind 114 increases causing the wind turbine 110 to rotate faster and, as described in more detail below, will result in the generation of more electricity.

From FIG. 1 it can be appreciated that the dynamic vehicle charging system for electric vehicles of the present invention may include more than one wind turbine 110. For instance, compartment 109 is sufficiently large to accommodate multiple wind turbines 110 with each configured to receive wind passing through the grill 114.

Figure 2:
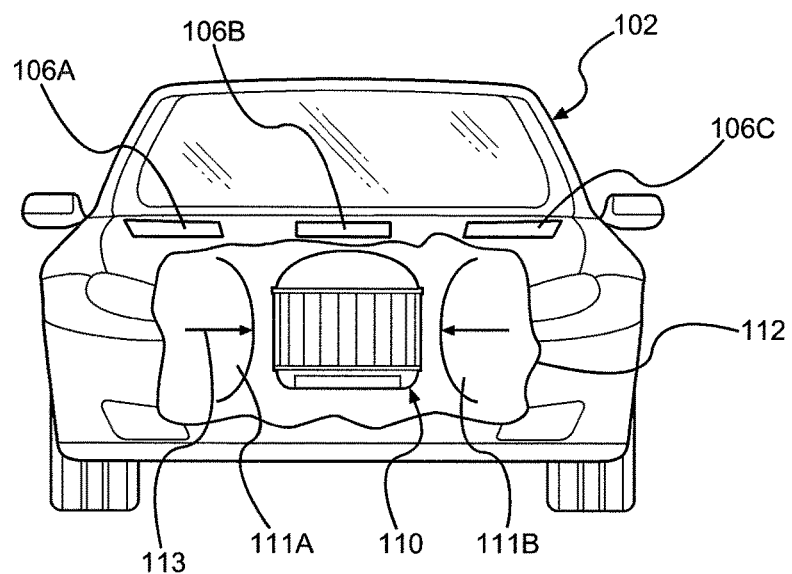
FIG. 2 is a front view of a vehicle equipped with the dynamic vehicle charging system for electric vehicles with portions of the vehicle grill removed for clarity, and showing the placement of the wind turbine within the front storage compartment.

FIG. 2 is a front view of the vehicle 102 equipped with the dynamic vehicle charging system for electric vehicles 100 with portions of the vehicle grill 104 removed for clarity. From this Figure, the placement of the wind turbine 110 within the front storage compartment 109 is shown such that the wind turbine 110 is in the direct flow of air through grill 104 so as to receive the maximum rotational force on wind turbine 110.

Figure 4:
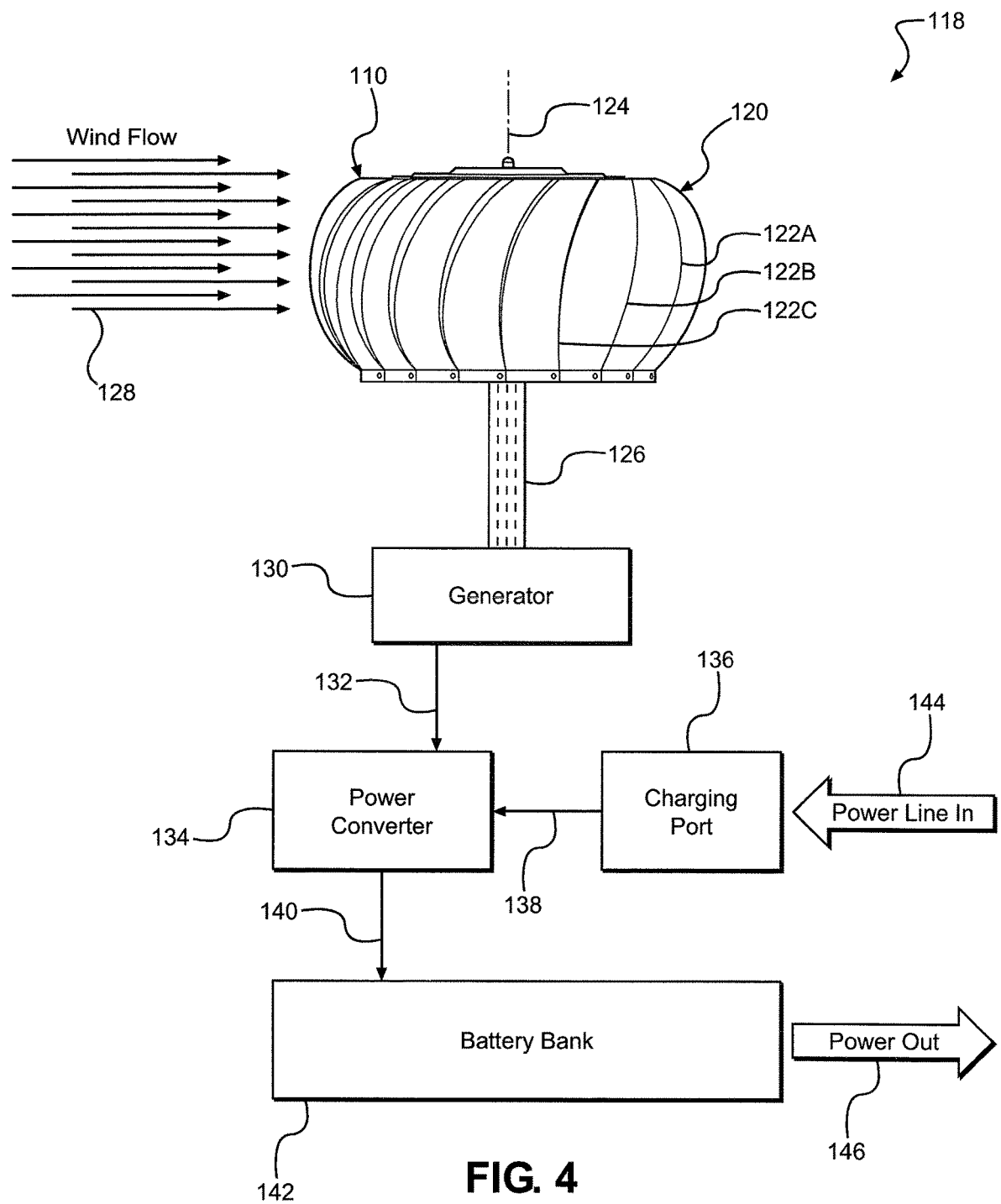
FIG. 4 is a block diagram showing the system components of the dynamic vehicle charging system for electric vehicles of the present invention including a wind turbine mechanically connected to a generator which when driven by a wind flow, rotates to generate electricity that is provided to a power converter which takes the electricity generated by the generator and directs it to the battery bank and which can be used as output power to drive the vehicle electric motors or recharge the vehicle battery bank.

As is known in the art, based on the Venturi effect, by decreasing the cross-sectional area of the air path from the grill 104 to the wind turbine 110, the air speed increases proportionally thus providing a greater wind velocity on the wind turbine 110 than the velocity 112 of vehicle 102, which results in a faster rotational speed of the wind turbine 110, and a corresponding greater electricity generation from the generator (shown in FIG. 4).

In order to ensure that the wind turbine 110 receives the maximum air flow, a cowling 111A and 111B (shown in dashed lines in FIG. 1) may be used to direct and focus the air flow from the grill 104 directly on the wind turbine 110. It is also to be appreciated that the cowling shape may be modified to suit a dynamic vehicle charging system for electric vehicles having more than one wind turbine 110 in order to properly direct the air flow through the turbines.

Cowling 111A and 111B may be made of a flexible material which can deform as air pressures grow as the velocity 112 increase. For instance, cowling 111A and 111B may be separated by a distance 113 when the car is stationary or at low speeds, but flexible enough so that distance 113 increases due to the air pressure of the wind passing through grill 104 into compartment 109. This prevents the overpressurization of the incoming wind onto wind turbine 110 in circumstances when the wind 114 is entering grill 104 at a velocity exceeding the rotational maximum of wind turbine 110. As the speed of vehicle 102 decreases and the corresponding speed of wind 114 decreases, cowlings 111A and 111B return to their original position to maximize the air flow through turbine 110. While cowling 111 is shown to have a right panel 111A and a left panel 111B, it is to be appreciated that cowling 111 may also have an upper and lower panel to provide precise control of all wind entering grill 104 to direct the wind onto the turbine 110.

In FIGS. 1 and 2, wind turbine 110 is shown to be a rotating wind turbine that is rotating on a vertical axis. However, it is to be appreciated that wind turbines or fan blade turbines mounted on a horizontal axis are also fully contemplated herein.

Figure 3:
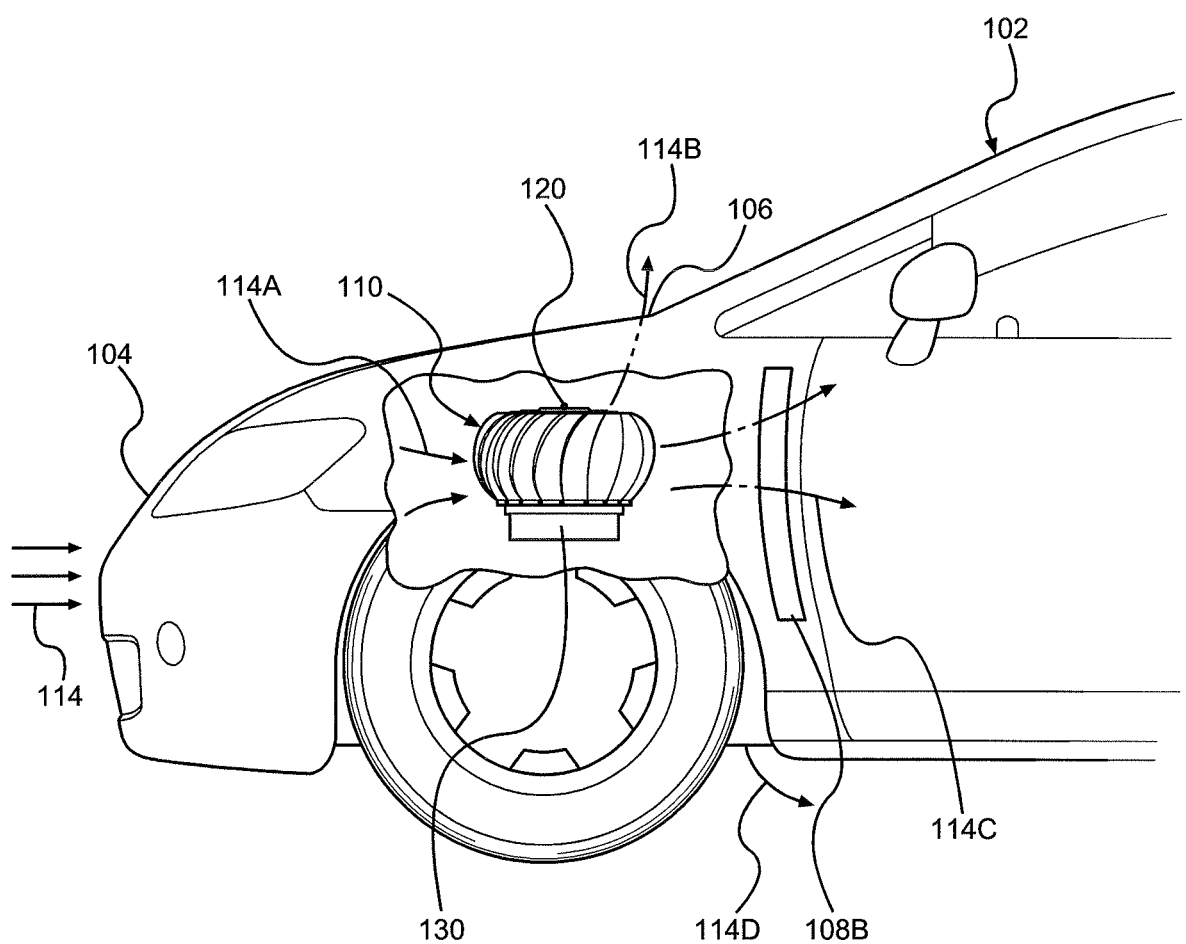
FIG. 3 is a side view of a vehicle equipped with the dynamic vehicle charging system for electric vehicles with a portion of the fender removed showing the placement of the wind turbine within the front storage compartment and the corresponding side panel vents allowing the free flow of air through the storage compartment, over or through the wind turbine, and out the vents.

FIG. 3 is a side view of a vehicle 102 equipped with the dynamic vehicle charging system for electric vehicles 100 with a portion of the fender removed showing the placement of the wind turbine 110 within the front storage compartment 109 and the corresponding side panel vents 108B allowing the free flow of air 114 through the storage compartment 109, over or through the wind turbine 110, and out the vents 106 and 108. Specifically, air flow 114 enters grill 104 as air flow 114A that hits wind turbine 110 causing it to rotate. Once the air flow 114A passes through the wind turbine 110, the air flow 114B exits hood vents 106, and air flow 114C exits side vents 108. Additionally, vents may be positioned on the underside of compartment 109 to allow air flow 114D to exit.

The capacity of grill 104 and vents 106 and 108 are sufficient that air flow 114 is not impeded as it passes through compartment 109. Grill 104 has a calculated effective cross-sectional area. Depending on the angle at which the grill 104 is positioned, the effective cross-sectional area of the grill 104 is determined by the size of the vent perpendicular to the air flow 114. For instance, if the grill 104 is positioned ninety degrees from the horizontal (e.g. vertical), the cross-sectional area would be equal to the effective cross-sectional area. However, if the grill 104 is positioned at a grill angle, (such as 60 degrees from the horizontal as is common with many vehicles for aerodynamic benefits), the effective cross-sectional area would decrease to the sine of the grill angle to be approximately 0.87 the vertical cross-sectional area due to the grill angle. (Effective cross-sectional area=sine(grill angle)×cross-sectional area; and sine (60)=0.866). Hood vents 106 and side vents 108 likewise are designed to have a total cross-sectional area. In a preferred embodiment, in order to avoid the creation of pressure within the compartment 109, the effective cross-sectional area of grill 104 is matched with the total cross-sectional area of the hood vents 106 and side vents 108. In an alternative embodiment, the effective cross-sectional area of the grill 104 is less than the total cross-sectional area of the hood vents 106 and side vents 108 to ensure ample venting for compartment 109.

As shown in FIG. 3, the wind turbine 110 is shown having a circular wind blade 120 that rotates in response to an air current 114A across it. A generator 130 is shown directly beneath and in mechanical connection to the rotating wind turbine 110. As the wind turbine 110 rotates, the generator 130 rotates, creating electrical energy which, as will be described below, is provided to a power converter 134 for use by the vehicle 102.

Referring now to FIG. 4, a block diagram showing the system components of the dynamic vehicle charging system for electric vehicles 100 of the present invention is shown and generally designated 118. Block diagram 118 depicts wind turbine 110 having a fan 120 with a series of fan blades 122A, 122B, 122C, etc. which, when exposed to wind flow 128, rotates about axis 124. As fan 120 of wind turbine 110 rotates, it rotates shaft 126 which is mechanically coupled to generator 130. As wind flow 128 strikes wind turbine 110, wind turbine 110 rotates and in turn rotates generator 130 which generates electricity. The electricity from generator 130 flows from generator 130 along power interconnect cables 132 to a power converter 134.

Power converter 134 receives the electrical energy from generator 130, converts it to a useable power source, and communicates it on cable 140 to battery bank 142. In a preferred embodiment, as generator 130 is rotated by the rotation of wind turbine 110, an alternating current (AC) voltage is generated and provided to power converter 134. In this instance, power converter 134 converts this alternating current (AC) voltage to a direct current (DC) voltage which is then provided to the battery bank 142. In an alternative embodiment, generator 130 generates a direct current (DC) voltage in response to being rotated by wind turbine 110; however, this voltage is typically different (higher or lower) than the voltage required for the battery bank 142 and provided as power out 146 to the vehicle motors. In this circumstance, power converter 134 may be configured to raise or lower the generator voltage to the voltage as needed and as required for battery bank 142.

Block diagram 118 also includes a charging port 136 configured to receive a power line input 144, such as an input from a typical charging station or home charging plug. When connected to power line in 144, power converter 134 receives the power from power line input 144 through charging port 136, and converts the incoming power to the voltage or voltages needed by battery bank 142.

In use, the dynamic vehicle charging system for electric vehicles 100 of the present invention can be used to offset the power consumption of the electric vehicle 102, or in high wind conditions, can be used to recharge the battery bank 142. For instance, a typical electric vehicle 102 can travel approximately 200 miles on a single charge from a fully charged state, to a compete depletion of the battery bank 142. When that vehicle 102 is equipped with the dynamic vehicle charging system for electric vehicles 100 of the present invention, wind turbine 110 rotates naturally as the vehicle is driven, and in turn rotates generator 130 to generate electricity that is passed to the power converter 134. Power converter 134 then adjusts the voltage to correspond to the requirements of the battery bank 142 and this adjusted electricity is provided via connection 140 to the battery bank 142 which is used to either charge the battery pack, or provide power out 146 to the vehicle, such as to a wheel's electric drive motor, thus reducing the need to pull power from the batteries within the battery bank 142. In the case of high-wind conditions, the generator 130 will generate higher levels of electricity which will help to further offset the increased need for electrical power to drive into the wind.

While the block diagram 118 depicts a dynamic vehicle charging system for electric vehicles having a single wind turbine 110 and generator 130 combination, it is to be appreciated that multiple wind turbines 110 coupled to their own generator may be incorporated without departing from the present invention. In cases where there are multiple generators 130, each provides its output 132 to power converter 134 that is configured to receive multiple inputs from multiple generators 130. Alternatively, each generator 130 in a multiple generator system may be equipped with its own power converter 134. In such a configuration, battery bank 142 will be configured to receive multiple inputs 140.

The efficiency of a vehicle 102 equipped with the dynamic vehicle charging system for electric vehicles 100 of the present invention is greatly improved over traditional electrical vehicles. For instance, the average electric vehicle requires 30 kilowatt-hours to travel 100 miles. This power is typically taken only from the on-board battery bank 142. Given that the battery bank storage capacity of a typical electrical vehicle can range from 17.6 kWh in the smallest electric vehicle, to up to 100 kWh in the most modern electrical vehicles, a typical range is from 58 to 300 miles. Since battery bank capacity is a key factor in the distance a vehicle can drive between charges, the additional of even a small offsetting power source would have a significant impact on range. For instance, the present invention provides an offsetting wind-driven power source during periods of use of up to 10 kWh. Even a modest 5 kWh level of energy generation provides a significant increase in the range of a typical electric vehicle on a single charge by nearly 17%. This additional electrical energy, when used as output power to drive the vehicle electric motors, significantly extends the range of an electric vehicle. Moreover, a higher level of energy generation above the nominal 5 kWh extends the range of the vehicle even further.

While the above description contains specific details regarding certain materials, elements, configurations, components, and other teachings, it is understood that embodiments of the invention or any combination of them may be practiced without these specific details. These details should not be construed as limitations on the scope of any embodiment, but merely as exemplifications of the presently preferred embodiments. In other instances, well known structures, elements, and techniques have not been shown to clearly explain the details of the invention.

I claim:

1. A dynamic vehicle charging system for use with an electric vehicle, comprising:
    a wind turbine mounted within the interior of the vehicle and positioned for exposure to the wind generated during the vehicle's natural driving motion wherein said wind turbine rotates responsive to said wind;
    a vent mounted some distance behind said wind turbine on the exterior of the vehicle to allow the wind to exit the interior of the vehicle;
    a generator in mechanical communication with said wind turbine such that when said generator rotates, said generator generates electrical energy;
    a power converter in electrical communication with said generator and configured to convert said electrical energy from said generator to a useable power source; and
    a battery bank having a plurality of vehicle batteries, said battery bank in electrical communication with said power converter and configured to receive said useable power source.

2. The dynamic vehicle charging system for use with an electric vehicle of claim 1, wherein said battery bank is configured to use said useable power source to recharge the vehicle batteries.

3. The dynamic vehicle charging system for use with an electric vehicle of claim 1, wherein said battery bank is configured to use said useable power source to offset an electricity consumption rate of the electric vehicle.

4. The dynamic vehicle charging system for use with an electric vehicle of claim 1, further comprising:
    a charging port in electrical communication with said power converter, said charging port receiving electrical energy from a power line; and
    said power converter configured to use said electrical energy from said power line to charge said battery bank.

5. The dynamic vehicle charging system for use with an electric vehicle of claim 1, wherein said electric vehicle comprises at least one electric drive motor; and said battery bank is configured to provide power out to power said at least one electric drive motor.

6. The dynamic vehicle charging system for use with an electric vehicle of claim 1, further comprising a cowling configured to direct said wind to said wind turbine.

7. A dynamic vehicle charging system for use with an electric vehicle, comprising:
- a plurality of wind turbines mounted within the interior of the vehicle and positioned for exposure to the wind generated during the vehicle's natural driving motion wherein said plurality of wind turbines rotate responsive to said wind;
- a plurality of vents mounted on the exterior of the vehicle positioned some distance behind said plurality of wind turbines to allow the wind to exit the interior of the vehicle;
- a plurality of generators each in mechanical communication with said plurality of wind turbines such that when each said generator rotates, said generator generates electrical energy;
- a power converter in electrical communication with said plurality of generators and configured to convert said electrical energy from said plurality of generators to a useable power source; and
- a battery bank having a plurality of vehicle batteries, said battery bank in electrical communication with said power converter and configured to receive said useable power source.

8. The dynamic vehicle charging system for use with an electric vehicle of claim 7, wherein said battery bank is configured to use said useable power source to recharge the vehicle batteries.

9. The dynamic vehicle charging system for use with an electric vehicle of claim 7, wherein said battery bank is configured to use said useable power source to offset an electricity consumption rate of the electric vehicle.

10. The dynamic vehicle charging system for use with an electric vehicle of claim 7, further comprising:
- a charging port in electrical communication with said power converter, said charging port receiving electrical energy from a power line; and
- said power converter configured to use said electrical energy from said power line to charge said battery bank.

11. The dynamic vehicle charging system for use with an electric vehicle of claim 7, wherein said electric vehicle comprises at least one electric drive motor; and
- said battery bank is configured to provide power out to power said at least one electric drive motor.

12. A dynamic vehicle charging system for use with an electric vehicle, comprising:
- said electric vehicle comprising a storage compartment having at least one grill configured to pass wind therethrough;
- a wind turbine within said storage compartment and configured to receive said wind from said grill;
- a vent configured to pass said wind from said storage compartment wherein said wind enters said grill, passes through said wind turbine, and exits said vent;
- a generator in mechanical communication with said wind turbine such that when said generator rotates, said generator generates electricity;
- a power converter in electrical communication with said generator and configured to convert the electrical energy from said generator to a useable power source; and
- a battery bank having a plurality of batteries, said battery bank in electrical communication with said power converter and configured to receive said useable power source.

13. The dynamic vehicle charging system for use with an electric vehicle of claim 12, further comprising:
- said grill having an effective cross-sectional area;
- said vent having a total cross-sectional area;
- wherein said effective cross-sectional area of said grill is equal to said total cross-sectional area of said vent.

14. The dynamic vehicle charging system for use with an electric vehicle of claim 13 wherein said vent comprises a plurality of vents, and wherein said total cross-sectional area of said vent comprises the sum total of all vent cross-sectional areas.

15. The dynamic vehicle charging system for use with an electric vehicle of claim 12, further comprising:
- said grill having an effective cross-sectional area;
- said vent having a total cross-sectional area;
- wherein said effective cross-sectional area of said grill is less than said total cross-sectional area of said vent.

16. The dynamic vehicle charging system for use with an electric vehicle of claim 15 wherein said vent comprises a plurality of vents, and wherein said total cross-sectional area comprises the sum total of all vent cross-sectional areas.

17. The dynamic vehicle charging system for use with an electric vehicle of claim 12, further comprising a cowling configured to direct said wind passing through said grill to said wind turbine.

18. The dynamic vehicle charging system for use with an electric vehicle of claim 17 wherein said cowling is deformable from a first position to a second position in response to increased wind entering said grill.

* * * * *